Patented Jan. 5, 1932

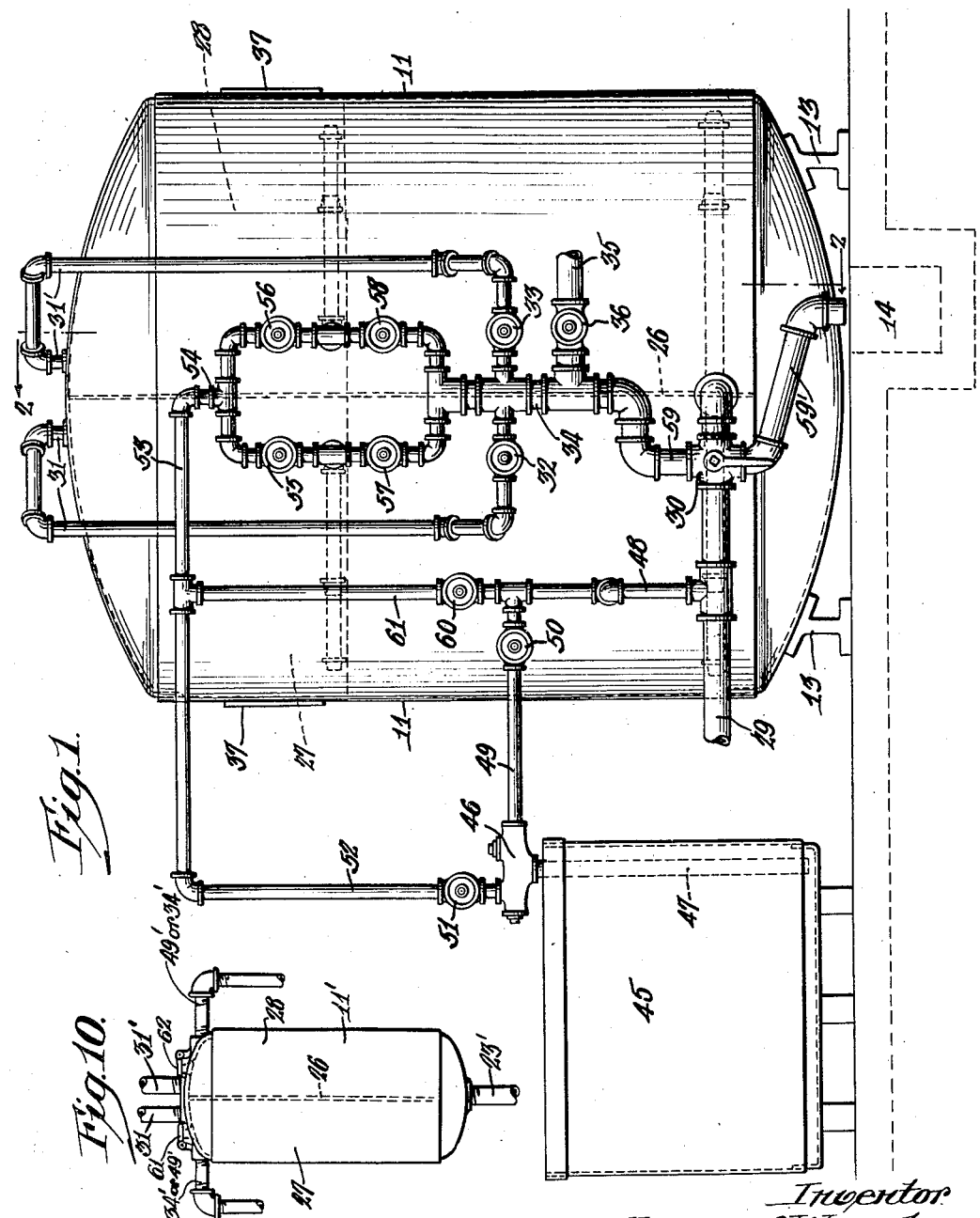

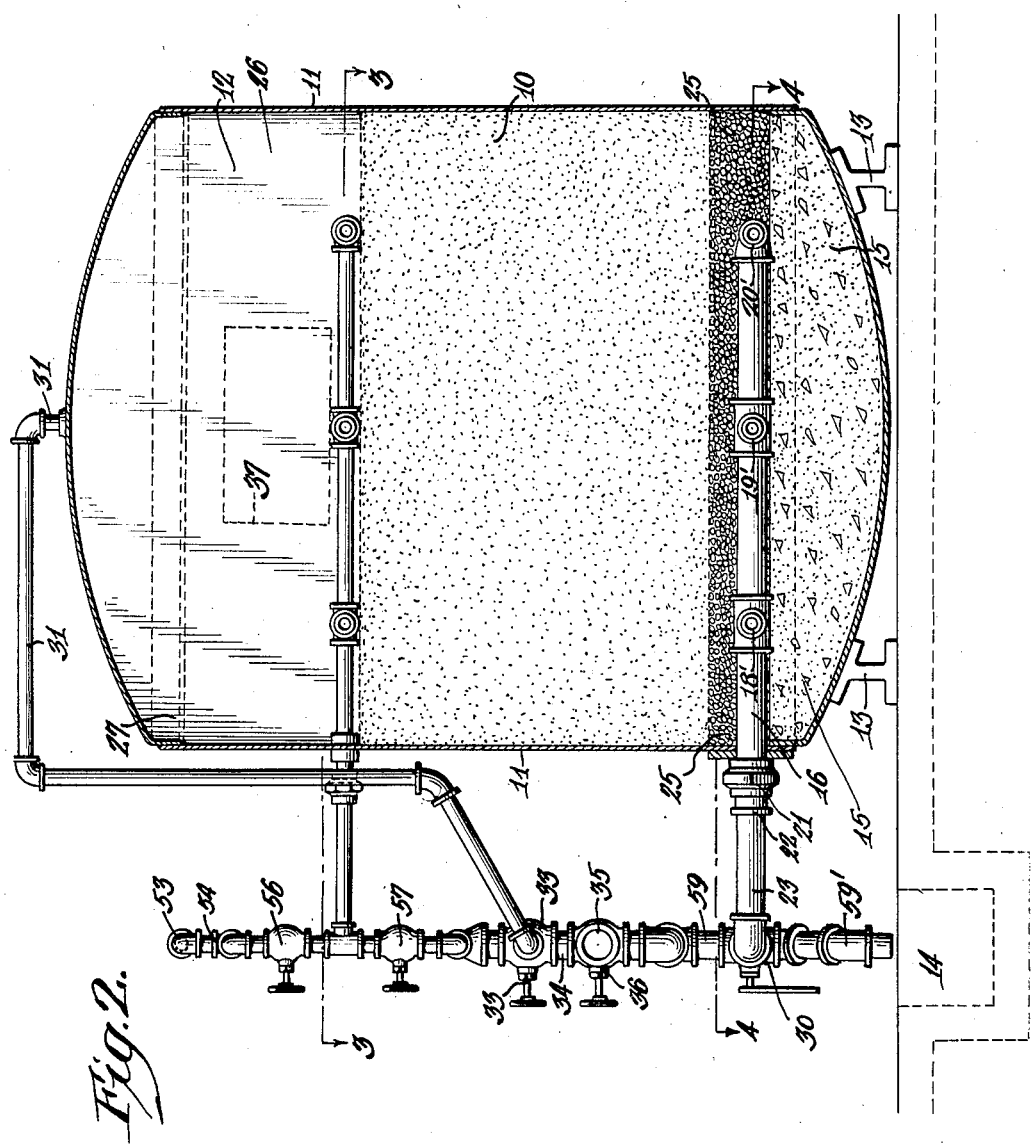

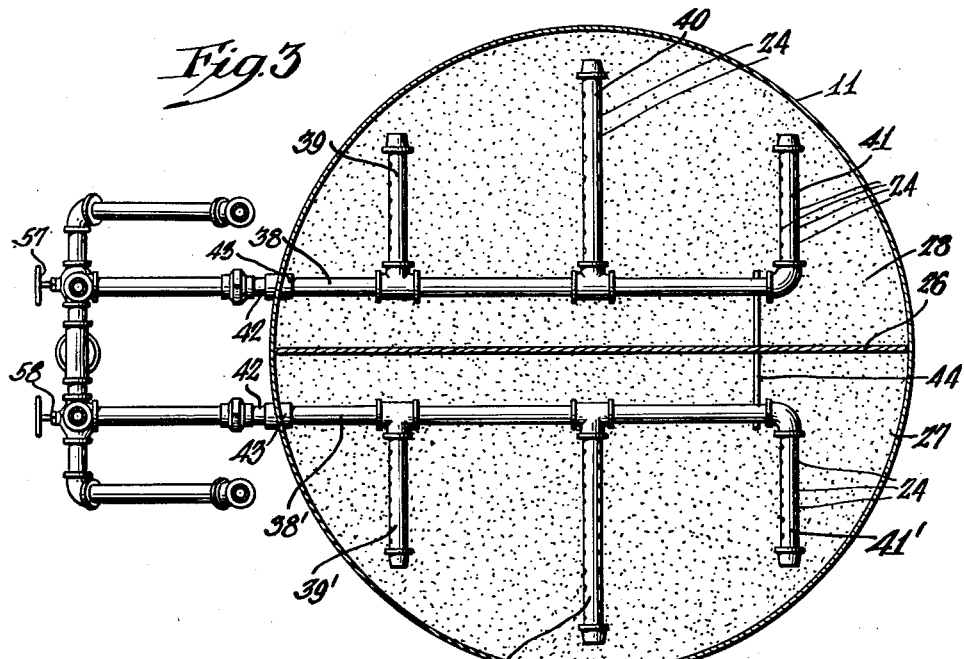
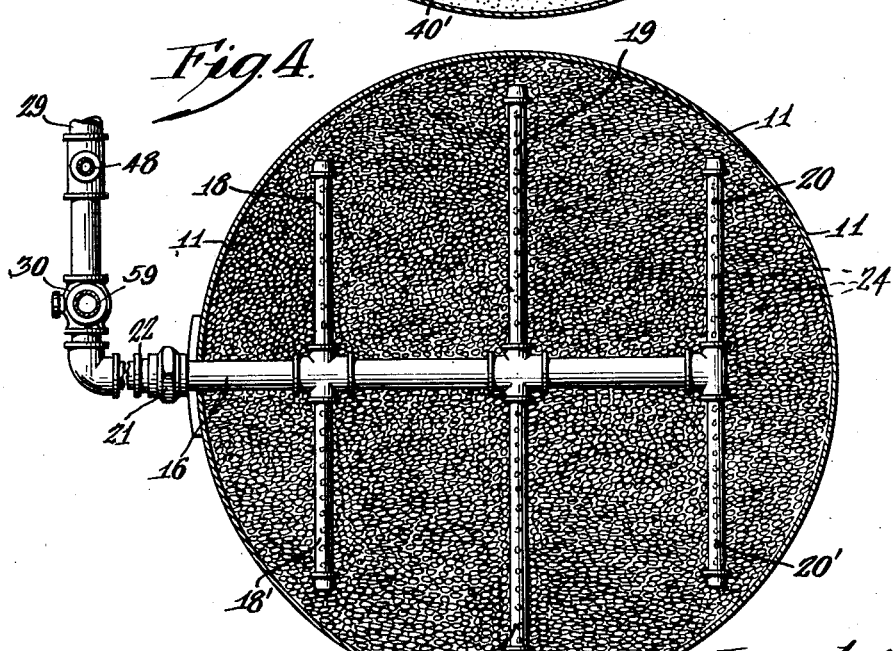

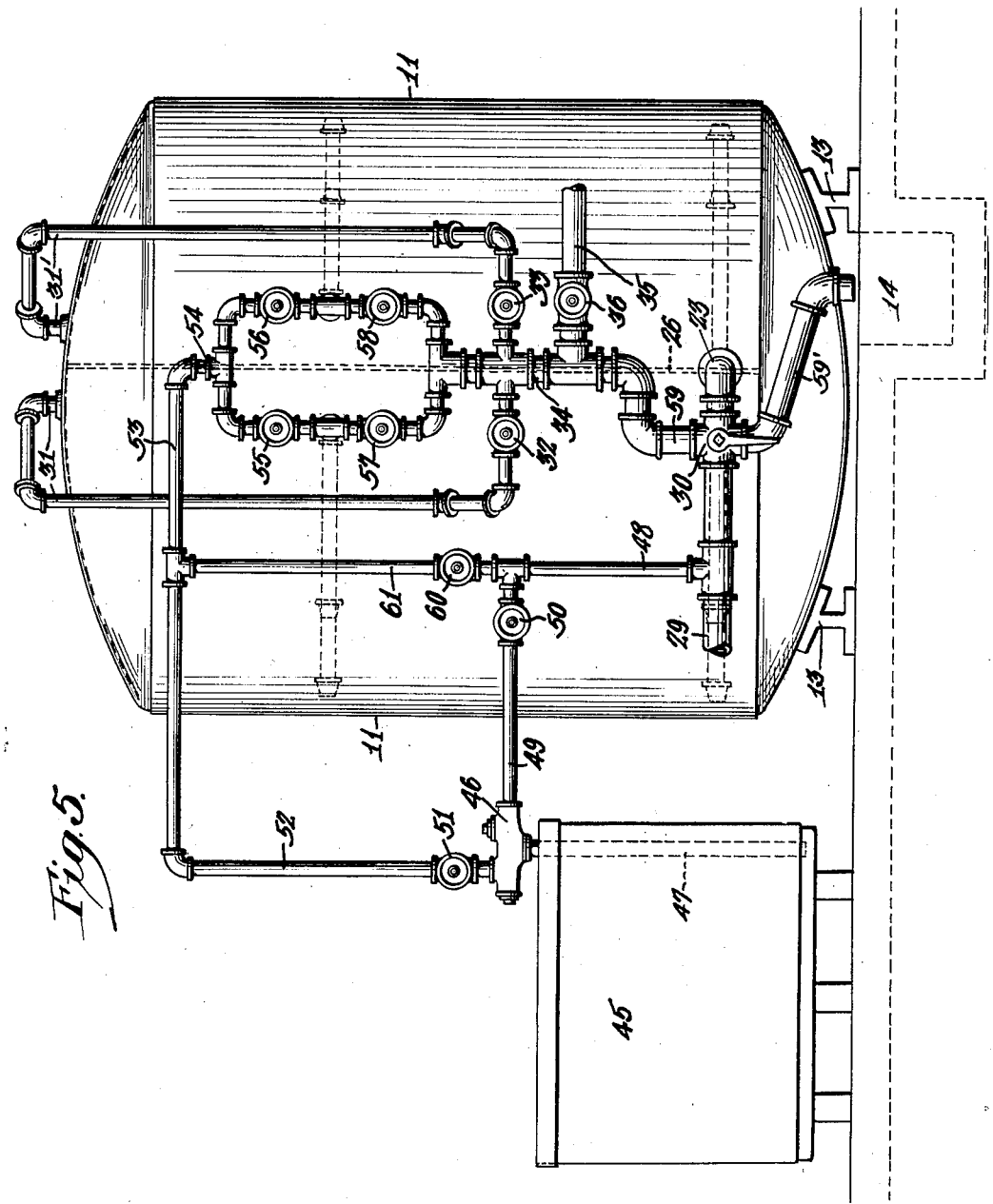

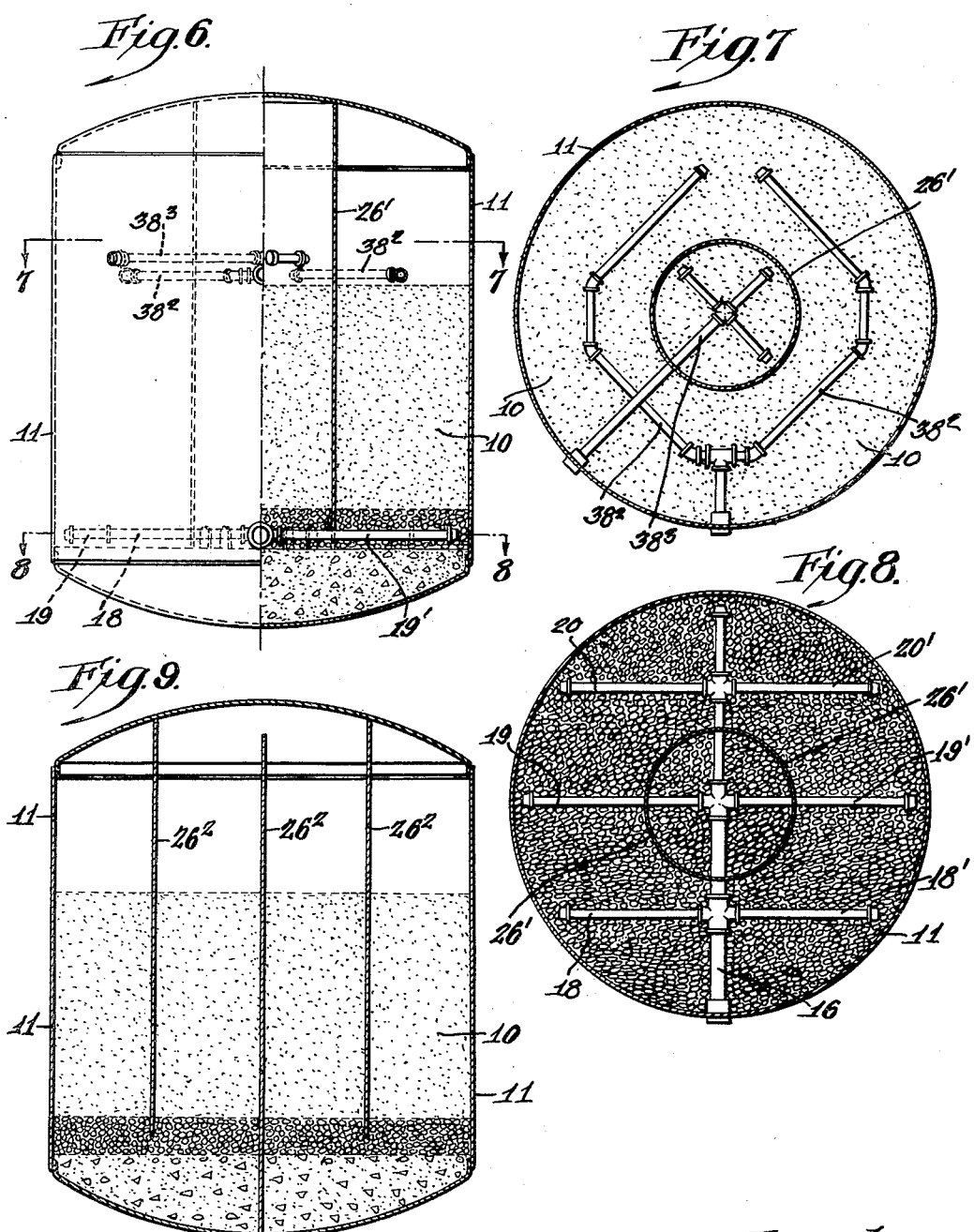

1,839,428

UNITED STATES PATENT OFFICE

HARVEY C. WAUGH, OF LLANERCH, PENNSYLVANIA, ASSIGNOR TO AMERICAN WATER SOFTENER COMPANY, OF PHILADELPHIA, PENNSYLVANIA, A CORPORATION OF NEW JERSEY

WATER SOFTENER

Application filed January 31, 1928. Serial No. 250,758.

My invention relates to an apparatus for using a bed of zeolite for water softening and adapted to easy regeneration of the zeolite in place.

A purpose of my invention is to pass regenerating liquor into a bed of zeolite at the top of a portion of the bed and to discharge it from the top of the bed at another portion thereof.

A further purpose is to divide a zeolite bed into two or more paths, to pass water to be treated through these paths in multiple and to pass regenerating liquor through them in series.

A further purpose is to improve the efficiency of regeneration by causing the regenerating liquor to traverse a reversed (longer) path of flow than the path of water treated by the zeolite.

A further purpose is to avoid unevenness of flow at the turning point of the reversed path by using distributing pipe conduit connection between opposite parts of the path, presenting inlets and outlets at suitably spaced intervals across the sectional areas of the bed on opposite sides of the turn.

A further purpose is to make the path of the liquor of progressively smaller area so that the zeolite receiving fresh liquor is engaged by a relatively smaller quantity of liquor that is moving relatively slowly, while the zeolite that is engaged by the partially spent regenerating liquor is engaged by a larger quantity of liquor that is moving at relatively higher velocity. I thus accommodate the velocity of passage of the regenerating liquor through the zeolites to the extent to which the liquor has become degenerated.

A further purpose is to send a stream of regenerating liquor into a bed of zeolite successively in opposite directions, introducing the liquor at the top at one portion of the bed and discharging it at the top at another portion, so that the liquor enters at the discharge point and discharges at the entering point of the preceding period, passing it chiefly in one direction and reversing for improvement of the bed, or alternately reversing the flow as preferred.

Further purposes will appear in the specification and in the claims.

I have elected to show a few only of the many forms of my invention, selecting forms that are practical and efficient in operation and which illustrate particularly well the principles involved.

Figure 1 is a front elevation of structure embodying my invention.

Figure 2 is a vertical sectional elevation of structure shown in Figure 1, the zeolite container being shown in section upon line 2—2 of Figure 1 and the piping being shown in full line.

Figures 3 and 4 are horizontal sections taken upon the lines 3—3 and 4—4 respectively, of Figure 2, and omitting some of the piping shown in Figure 2.

Figure 5 is a view generally similar to Figure 1, showing a modification.

Figures 6 to 8 show another modification, Figure 6 being a front elevation, half in section, and Figures 7 and 8 respectively sections upon the lines 7—7 and 8—8 of Figure 6.

Figure 9 is a diagrammatic vertical section of a different form.

Figure 10 is a side elevation of another form.

Like numerals refer to like parts in all figures.

Describing in illustration and not in limitation and referring to the drawings:

Figures 1 to 4 show a preferred form of my invention.

A bed 10 of zeolite is placed in a closed shell 11 of strength suitable for the normal water pressures used, and piping and connections are provided adapting the water under treatment to enter the container below the bed and to rise through the bed across its whole area into a collecting space 12 above the zeolite.

Additional piping is provided for delivering regenerating liquor at the top of the zeolite and to cause it to flow downwardly through one-half of the sectional area of the zeolite and then upwardly through the other half, to leave the bed at the top of the other half.

As illustrated the shell is supported upon suitable legs 13 adjacent a drain 14. Water inlet and distributing piping is provided at the bottom and supported upon a concrete floor 15. The piping comprises an inlet pipe 16 and a plurality of oppositely extending apertured distributing pipes 18, 19 and 20, 18', 19' and 20', which receive water from the pipes 16 and also communicate freely across it, 18, 19 and 20 with 18', 19' and 20'.

Desirably the water inlet piping should be adapted to be readily put in or taken out without disturbing the tightness of the seal between the piping and the outer wall of the shell. One way to accomplish this is to provide a union connection 21 between the interior piping and the inlet end 22 of the feed pipe 23.

The branching interior piping preferably rests upon the flat concrete floor and is adapted to deliver water through the perforations 24 along the under sides of the lengths of the different branches so as to distribute the inlet water substantially uniformly over the whole bottom of the bed of zeolite.

Preferably I provide a bed 25 of clean gravel for some distance above the water inlet piping. This bed insures greater uniformity in the rate of upward flow of the water and also somewhat lessens the requisite quantity of zeolite within the container.

The bed of zeolite is of considerable depth and I provide a considerable settling space between the top of the zeolite and the roof of the container, whose principal function is to avoid danger of particles of zeolite being carried over mechanically with the water which is leaving the container.

The container is divided by a vertical baffle, partition or dam 26 into compartments 27 and 28. The baffle should extend from the roof downwardly to a point approximately at the bottom of the bed of zeolite, leaving room for cross flow of regenerating liquor through the zeolite or through the gravel if cross piping be not used or, more desirably, as illustrated in the drawings may extend all the way to the concrete floor, the compartments on opposite sides of the dam being then connected by the piping 18, 19, 20, 18', 19' and 20' (Figure 4).

The two compartments divided by the partition are thus in conduit connection at the bottom of flow across under the division wall, or through the piping, either or both.

The raw water enters through supply pipe 29 and a two-way plug valve 30 alternatively connecting the supply and feed pipes for the normal run or cutting off the supply and provided discharge to a sewer for regenerating liquor and wash water from regeneration.

For household use it is probable that the two compartments would give greatest satisfaction if made equal in size while for commercial establishments they would probably operate better if one be of much larger cross-section than the other.

In the first form shown the dividing wall is in or near the middle of the tank so as to divide the container into vertical compartments of approximately equal cross section.

It will be seen that the presence of the vertical division has substantially no effect upon the flow of water which is to be treated by the zeolite, which enters at the bottom at many sectionally spaced inlets from the branching piping, rises through the gravel bed, through the zeolite beds of both compartments and through the settling spaces to leave the container at the top through suitable outlet pipes 31 and 31', one from each compartment. These pipes connect through valves 32, 33 with a pipe 34 from which the treated water is fed to discharge pipe 35 through valve 36. This pipe 34 is connected with the two-way valve 30 so as to connect to drain in one position of the valve or to be closed from the drain in all other positions of the valve.

Each compartment may be provided with a suitable manhole 37 placed above the desired upper level of the zeolite bed.

As is well known, the water softening characteristics of zeolite gradually lessen during use, soluble alkaline bases of the zeolite being replaced by the insoluble base of the water under treatment, and at intervals the zeolite must be regenerated. This is accomplished by treating the bed with salt solution, so generally used that it is here considered to be typical of regenerating liquors.

In the apparatus of my invention the regeneration is effected without disturbing the bed of zeolite within the container. For this purpose I provide the compartments 27 and 28 with branching distribution systems shown (Figure 3) as main pipes 38, 38' and side branches 39, 40 and 41 and 39', 40' and 41'. These pipes are preferably located just above the upper surface of the zeolite. These also are adapted to be put in place or removed without affecting the tightness of seal between their inlet nipples 42 and the shell of the container, as by means of outside unions 43. Pipes 38 and 38' may be supported from the partition by brackets 44.

Suitable perforations are provided preferably along the sides of the lengths of the different pipe sections so as to give substantially even distribution of inlet and of outlet across the sections of the respective compartments.

During regeneration one of the branching pipe systems forms an inlet for the salt solution while the other forms an outlet and each pipe system acts as inlet while the other is outlet and outlet while the other is inlet.

The salt solution is held in tanks 45 from which it may be fed by water-operated ejector 46, from which suction pipe 47 extends down into the tank 45. The water from supply pipe 29 is connected to the ejector by pipes 48 and 49 controlled by valve 50. From the ejector the salt solution passes through valve 51 and pipes 52 and 53 to a point 54 where it may be passed downwardly through either of two valves 55 or 56, whichever be open, but not through both, into pipe 38 or 38', as the case may be. The salt solution is thus passed out upon the surface of the zeolite on the side selected through the apertures in this distributing system. Whichever valve 55 or 56 be open, the other valve on the same side 57 or 58 must be closed.

Both of the distributing systems fed through valves 55 and 56 are capable of connection, one at a time, through valves 57 and 58 with the common passage 34 ultimately connected to the drain by pipe 59. The water in the tank can be drained preliminarily to the level of the surface of the zeolite, if desired, but this is not necessary. Whether this water be drained or not, the salt solution coming in upon one side will percolate down through the zeolite on that side of the tank at which it is introduced, will pass across to the other compartment either through beneath the partition, if that be permitted, or through the distributing pipes in the bottom of the tank. It will then pass up through the zeolite in the other compartment of the tank, and out through the other distributor 38' or 38 and the other of the valves 58 or 57, pipe 34 and the two-way valve to the drain.

After the full charge of salt has been inserted passage of the solution through the zeolite may be facilitated and washing may be effected by closing valves 50 and 51 and opening valve 60 in a short connection 61 between pipes 48 and 53. This results in washing the salt solution out, along the same path as that traversed by the salt solution.

Just as the salt solution is most desirably passed through under pressure rather than by gravity, so also the wash water in most desirably passed through under pressure. In either event passage of the salt solution or wash water through the zeolitic bed to the drain requires that valves 32 and 33 be closed and that the two-way valve be open to the drain cutting off water inlet from the bottom of the bed.

As it is desirable to withdraw the salt solution from as close to the surface of the zeolite bed as possible valve 33 should be closed also.

Valves 32 and 33 in the soft water outlet are closed so that the compartments may be put under pressure, to speed up the operation of washing the salt solution through and cleansing from it.

Salt solution which is started downwardly through the compartment 27 from the surface of the zeolite in compartment 27 will have lost part of its regenerating value before it reaches the compartment 28 and begins its upward flow in compartment 28, because part of its sodium will have been taken up by the zeolite through which it passes. Its regenerating effect in compartment 28 will not only be less per unit of solution passed through the compartment, but the ultimate percentage of regeneration which it is capable of effecting will also have been reduced. As a consequence, at the end of the regeneration, the zeolite in compartment 27 will be capable of more efficient water softening action than that in compartment 28. It is for this reason that regeneration is alternated, the salt solution for one run passing downwardly through the zeolite in the left-hand compartment and upwardly though the zeolite in the right-hand compartment and that for the next regeneration passing downwardly through the zeolite in the right-hand compartment and upwardly through the zeolite in the left-hand compartment.

The form shown in Figure 5 is intended to be the same as that shown in Figure 1 except for a difference in the cross-sections of the two compartments.

The partition 26 is shown in the middle in Figure 1 and is shown to the right of the middle in Figure 5 giving a very much larger cross-section at the left of the partition than that at the right.

The purpose of shifting the partition in the form of Figure 5 is to concentrate the salt solution which has become partially spent upon a smaller body of zeolite during the latter half of its run.

Fresh salt solution will of course have a higher degree of efficiency than salt solution which has been partly spent and will be capable therefore of replacing a larger quantity of calcium or magnesium in the zeolite during a given time or for a given quantity applied than is the case with the partly spent solution. With a larger initial cross-section than the final cross-section for the run the same quantity of salt solution will be passed though a smaller volume of zeolite in the compartment at the right than the volume of zeolite through which the salt solution has first been passed, tending to equalize the regenerating effect of the salt solution in the two compartments.

The disparity of regenerating effect in the two compartments where the cross-sections of zeolite are equal in both makes it desirable that regeneration be effected alternately in opposite directions in the Figure 1 form, but in the form shown in Figure 5 regeneration would preferably take place most of the time downwardly through the left-hand compartment (of larger cross-section) and upwardly through the right-hand compartment (of smaller cross-section) with occasional intervening regenerations downwardly through the right-hand compartment and upwardly through the left-hand compartment in order to give the zeolite in the right-hand compartment the benefit of treatment by fresh salt solution.

In the form shown in Figures 6, 7 and 8 the same principle is applied as in the form shown in Figure 5, but the partition is cylindrical instead of being plane. Regeneration will therefore take place for the most part downwardly through the outer compartment of annular cross-section and upwardly through the enclosed compartment of cylindrical cross-section. There should be intervening occasional regenerations downwardly through the interior cylindrical compartment and upwardly through the surrounding annular compartment.

As seen in Figure 8 inlet of raw water to be treated can be supplied by the same kind of piping connections as shown in Figure 4. On the other hand the piping shown in Figure 3 is not well suited to application and withdrawal of regenerating liquid and wash water. I have therefore provided a different form of inlet and outlet piping shown at $38^2$ and $38^3$ which is better suited to distribution and removal of salt solution and wash water to and from the compartment shown in Figure 6.

In the form shown in Figure 9 the partitions $26^2$ are the same character as seen in Figures 1 and 2, but are increased in number so as to provide for two complete up and down courses of flow for the salt solution and wash water. This is inserted for the purpose merely of showing that my invention is not restricted to a single reverse flow but that it can be applied where the number of compartments is greater than two. In this last figure the inlet and outlet distributing and discharge piping have been omitted.

It will be obvious that the counter-flow, application and withdrawal of salt solution has the advantage of providing for easy and frequent reversal of flow in each compartment, upwardly in that in which the flow has previously been downwardly in that in which the flow has been upwardly so as to get a mechanism benefit of the good points of both flows. I accomplish the separation of the grains with access to the salt solution to all parts of them claimed for upward flow of regenerating liquid and, upon the next reversal of flow, secure all benefits of concentration of the bed which are claimed for downward flow of regenerating liquid.

In all of my forms the wash water follows the counter-flow path of the regenerating liquid and as is true also of the regenerating liquid itself, may be applied by gravity or pressure flow as desired.

In all of my forms both salt solution and the wash water are applied to and withdrawn from the upper surface of the zeolite bed and resulting in the lower part of the tank being set aside for raw water admission only, free from the complication of discharge at this point.

By regenerating in one direction of flow and partly but not wholly washing the salt through and there regenerating in the opposite direction to use the remaining salt with a new salt solution, subsequently washing fully, both economy and maximum uniformity of regeneration are secured.

The fact that I run the salt solution through a greater length of zeolite bed enables me to get a considerable greater advantage from the salt than has previously been possible. For example, salt which is regarded as spent in other regenerating functions will still perform some advance regeneration upon the furthest part of the zeolite to be reached by the solution in the direction of regenerating flow.

Throughout the discussion thus far I have used the terms "regenerating liquor", "regenerating solution", "salt solution" and similar language as if the regenerating liquid would, of course, be supplied as a liquid to the casings shown in the figures. Though this would generally be the case it is by no means necessary that the liquid be supplied this way. The salt can and in household use probably would be inserted within the tank as a solid and would be dissolved within the tank. I have illustrated a structure in which granular salt would be supplied within the tank in Figure 10 where a tank $11'$ is shown, having raw water inlet $23'$, partition 26, soft water outlets 31, $31'$ for the two compartments shown and alternative water inlets or outlets to waste indicated as $34'$ or $49'$ and $49'$ or $34'$. I have not considered it necessary to show the valves and connections by which these are controlled.

In the tank casing above the zeolite levels in the two contiguous compartments 27 and 28 I have provided openings closed by doors 61 and 62 adapted to withstand water pressure. Through either one of these openings a regenerating charge of salt can be inserted directly upon the upper surface of the corresponding portion of the bed, the entire charge being inserted for one regeneration upon one side of the bed, and for the opposite direction of regeneration upon the top of the other side of the bed.

Whichever direction of regeneration be selected, it will be apparent that the introduction of water (preferably under pressure) above the bed will not only dissolve the salt but will carry the salt solution thus formed through the bed, down through one part of the bed, beneath the partition 26 and up through the other part of the bed to the drain, the salt passing through the bed as solution just as in the form in Figure 1. The analogy between the two forms will be seen to be very close when it is considered that the form of Figure 1 merely mixes the salt water outside of the tank and provides the driving force from the supply of water under pressure through pipe 49 and before the tank is reached, whereas the form of Figure 10 introduces water corresponding to the supply through pipe 49 directly into the tank and uses this water to dissolve the salt and to drive the salt solution thus formed through the zeolite bed.

For the reasons above I have referred to passing or flowing salt solution, or regenerating solution, or liquor, through the zeolite bed and have used other somewhat similar language in the claims with the intention of covering either form. Except for convenience in the mechanics of handling, it makes no difference whether the regenerating liquor be prepared outside the tank and inserted as liquor or inside the tank by commingling the water under pressure by which the regenerating material is to be driven through the bed with a solid regenerating material within the tank so as to transform the solid material into liquor physically within the tank.

From tests made it would appear that a considerable amount of the salt can be saved.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent is:—

1. The method of using and regenerating a zeolite bed which consists in passing water through the bed until it is in need of regeneration, regenerating the bed by passing salt solution through the bed in one direction of flow, in at one point and out at another point of the bed, again using the bed to soften water and subsequently regenerating the bed in the opposite direction of regenerating liquid flow.

2. The method of passing water through a zeolitic bed and regenerating and washing the bed, which consists in passing the water upwardly through two different paths for treatment and in passing regenerating liquid downwardly through one of the paths and upwardly through the other.

3. The method of passing water through a zeolitic bed and regenerating and washing the bed which consists in dividing the upper portion of a zeolitic bed into two contiguous parts connected at the bottom, in passing raw water upwardly through both parts to the treated water discharge and passing regenerating liquor and subsequently wash water downwardly through one part across to the other part at the bottom and upwardly through the other part, reversing the direction of flow of regenerating and wash water flow at intervals.

4. A zeolitic water softener having horizontally adjacent bed compartments in communicating at the bottom and having connections for upward flow of the water under treatment and for regeneration and for washing downwardly in one compartment across to the other and upwardly in the other.

5. A zeolitic water softener having a bed of zeolite, inlet and outlet connections for raw and treated water, respectively below and above the bed, in combination with a supply of regenerating material and reversible inlet and outlet connections for liquid at different portions of the top of the bed adapted to supply reversible pressure and discharge for causing regenerating flow through the bed, and a wall between the portions to make the flow from the inlet to the outlet pass through the body of the bed.

6. A zeolitic water softener having a bed of zeolite and inlet and outlet connections for raw and treated water, respectively below and above the bed in combination with connections providing regenerating liquor inlet and outlet at different portions of the top of the bed and a wall between the portions extending downwardly through a major portion of the bed to make the liquor flowing from the inlet to the outlet pass through the body of the bed.

7. A zeolitic water softener having a bed of zeolite and inlet and outlet water connections respectively below and above the bed, and a supply of regenerating material, in combination with connections providing inlet and outlet for liquid at different portions of the top of the bed, adapted to supply reversible pressure and discharge for causing regenerating flow through the bed, a wall between the portions, extending downwardly through a major portion of the bed to make the flow from the inlet to the outlet pass through the body of the bed and reversible wash or water connections on opposite sides of the wall causing the wash water to follow the path of regeneration flow through the bed.

8. In a zeolitic water softener, walls forming two compartments communicating at the bottom of each, inlet connection for raw water at the bottoms of the two compartments, connection for drawing off treated water at the tops of the compartments and means for admission of regenerating material and water at the top of the zeolite in one of the compartments and for withdrawal of the spent regenerating liquid at the top of the zeolite in the second compartment, whereby water treatment takes place in parallel upwardly in both compartments and regeneration takes place downwardly in one compartment and upwardly in the other.

9. In a zeolitic water softener, walls forming two compartments of substantially equal cross section having communication between the compartments at the bottom, distributing channels adapted to feed raw water to the bottom of both compartments and forming communication and distributing connections across between the bottoms of the compartments, connections for withdrawing treated water from the tops of the compartments and for applying wash water above the zeolitic surface in either compartment at will while shutting it off from the other compartment, and means for admitting regenerating material and water above the zeolite in one compartment and withdrawing the wash water from above the zeolite in the other compartment.

10. In a zeolitic water softener, two horizontally adjacent compartments having communication between the compartments at the bottom, a distributing pipe adapted to feed raw water to the bottoms of both compartments and forming communication and distributing connection between the bottoms of the compartments, connections for withdrawing treated water from the tops of the compartments and for applying wash water to the top of the zeolite in either compartment at will while discharging it from the other compartment and means for applying regenerating material and water at the top of the zeolite in one compartment and withdrawing the washed water from above the zeolite in the other compartment, the path of the regenerating liquid being reversible to regenerate upwardly in either compartment and downwardly in the other.

11. A zeolitic water softener comprising a pair of compartments, one cylindrical in cross-section and the other annular in cross-section surrounding the first, connections for raw water inlet at the bottoms of both compartments to flow the water upwardly through both, connections for outlet of treated water to the mains and connections above the zeolitic bed in both compartments for salt water and wash water introduction in either compartment at will with outlet through the other.

HARVEY C. WAUGH.